(12) United States Patent
Stanley

(10) Patent No.: US 6,297,975 B1
(45) Date of Patent: Oct. 2, 2001

(54) GENERALIZED METHOD OF PARALLELING VOLTAGE AMPLIFIERS

(75) Inventor: Gerald R. Stanley, Osceola, IN (US)

(73) Assignee: Crown Audio, Inc., Elkhart, IN (US)

( * ) Notice: Subject to any disclaimer, the term of this patent is extended or adjusted under 35 U.S.C. 154(b) by 0 days.

(21) Appl. No.: 09/329,759

(22) Filed: Jun. 10, 1999

Related U.S. Application Data

(60) Provisional application No. 60/100,602, filed on Sep. 16, 1998.

(51) Int. Cl.[7] .................................................... H02M 7/00
(52) U.S. Cl. ............................................. 363/65; 363/71
(58) Field of Search ................................ 363/65, 67, 69, 363/71

(56) References Cited

U.S. PATENT DOCUMENTS

| | | | |
|---|---|---|---|
| 4,149,233 | * | 4/1979 | Nagano .................................. 363/71 |
| 4,356,403 | | 10/1982 | Mohat .................................... 307/60 |
| 5,245,525 | * | 9/1993 | Galloway et al. ..................... 363/71 |
| 5,317,498 | * | 5/1994 | Dhyandchand et al. ........... 363/71 X |
| 5,446,645 | * | 8/1995 | Shirahama et al. ................... 363/71 |
| 5,566,060 | * | 10/1996 | Shimer et al. ......................... 363/65 |

OTHER PUBLICATIONS

"A Classification and Evaluation of Paralleling Methods for Power Supply Modules" by Shiguo Luo, Z. Ye. R. Lin and Fred C. Lee, Virginia Power Electronics Center, (No date).

* cited by examiner

Primary Examiner—Jessica Han
(74) Attorney, Agent, or Firm—Baker & Daniels

(57) ABSTRACT

A generalized method for balancing paralleled power converters is disclosed wherein (N) power converters, generally voltage amplifiers, are parallel and have current sensors positioned so as to form a differencing equation for the circulating current, and use that difference current as feedback to the paralleled power converters to force the circulating current to zero. The current sensors are current transforming transducers, where (N−1) transducers are included and where the feedback from the (N−1) transducers is distributed to summing amplifiers, which according to their gain distribution, balances the power converters. The system also includes passive magnetic devices to facilitate current sharing, where the devices are generally inductors which are designed to store no magnetic energy when under balanced excitation.

12 Claims, 2 Drawing Sheets

SYMMETRY LINE FOR HALF BRIDGE

GENERALIZED METHOD OF PARALLELING VOLTAGE AMPLIFIERS

This application is a continuation of a provisional application No. 60/100,602 filed Sep. 16, 1998.

BACKGROUND OF THE INVENTION

1. Field of the Invention

The invention is directed to a method for adding two or more power amplifiers in parallel, and balancing the current between the parallel joined amplifiers.

2. Prior Art

Paralleling of amplifiers (fast four quadrant DC to AC power converters) has been done for some time, but presently, the amplifiers are changing from linear to switch-mode technology. Also the environment in which they operate is continuing to demand larger amounts of power. When parallel amplifiers do not share current, costly inefficiencies arise.

At first paralleling of amplifiers was done by using simple passive ballasting. Linear amplifiers had wide bandwidth and fairly small phase errors which led to substantial conformity of gain and phase characteristics. High frequency circulating currents were reduced by using a highly coupled center tapped inductor whose center tap joined to the loads and whose ends attached to an amplifier output. If the amplifiers are delivering equal currents, such as inductor will store no net energy and thus no signal voltage will be lost to inductance. It is important not to loose signal voltage as the cost of generating large amounts of power are also large.

When the demands on the ballast resistors grew to more than 250 Watts of dissipation, negative current feedback was used to synthesize an effective amplifier output resistance (lossless). This constituted a second and improved generation of paralleling design.

With the advent of high efficiency switch-mode amplifiers additional issues have arisen. Output currents are typically larger and the gain and phase characteristics are now much looser in tolerance, potentially making current sharing more difficult.

One of the preferred uses of the subject paralleled amplifiers is in the medical industry, for use with magnetic resonance imaging (MRI), where the load on the system is the gradient coil of the MRI device. This environment is relatively hostile for gradient signal processing, because the MRI device has large amounts of peak RF power (<=20 KW) supplied to coils which are immediately inside the gradient coils. With such intimate coupling, it is necessary to place low-pass filters in the feed lines to the gradient coils to contain the RF currents. These filters tend to aggravate an already bad situation for establishing wide bandwidth negative current feedback. Large phase response lags within the amplifiers and distributed capacitances in the gradient coils already have limited the amounts of feedback that can be used to control the system. Any controls added to effect current sharing dare not corrupt the output signal as there is insufficient feedback to correct any significant injected non-linear errors. Therefore some of the methods practiced by the DC to DC converter industry for current sharing are not applicable here.

What is desired is a lossless means of sensing circulating (unbalance) currents caused by mismatched parallel power converters and introducing output corrections in such a manner as to not influence the net output available to the load. This implies that the entire method is lossless and also has no net output inductance added to the load circuit.

SUMMARY OF THE INVENTION

The objects of the invention have been accomplished by providing a system of two or more (n) parallel joined power converters which use current sensors to directly measure the circulating currents and by use of negative feedback regulates the circulating current to zero. Preferably this system uses passive magnetic devices to facilitate current sharing, which devices are each designed to store no magnetic energy when under balanced excitation.

DETAILED DESCRIPTION OF THE PREFERRED EMBODIMENT

Figure 1:
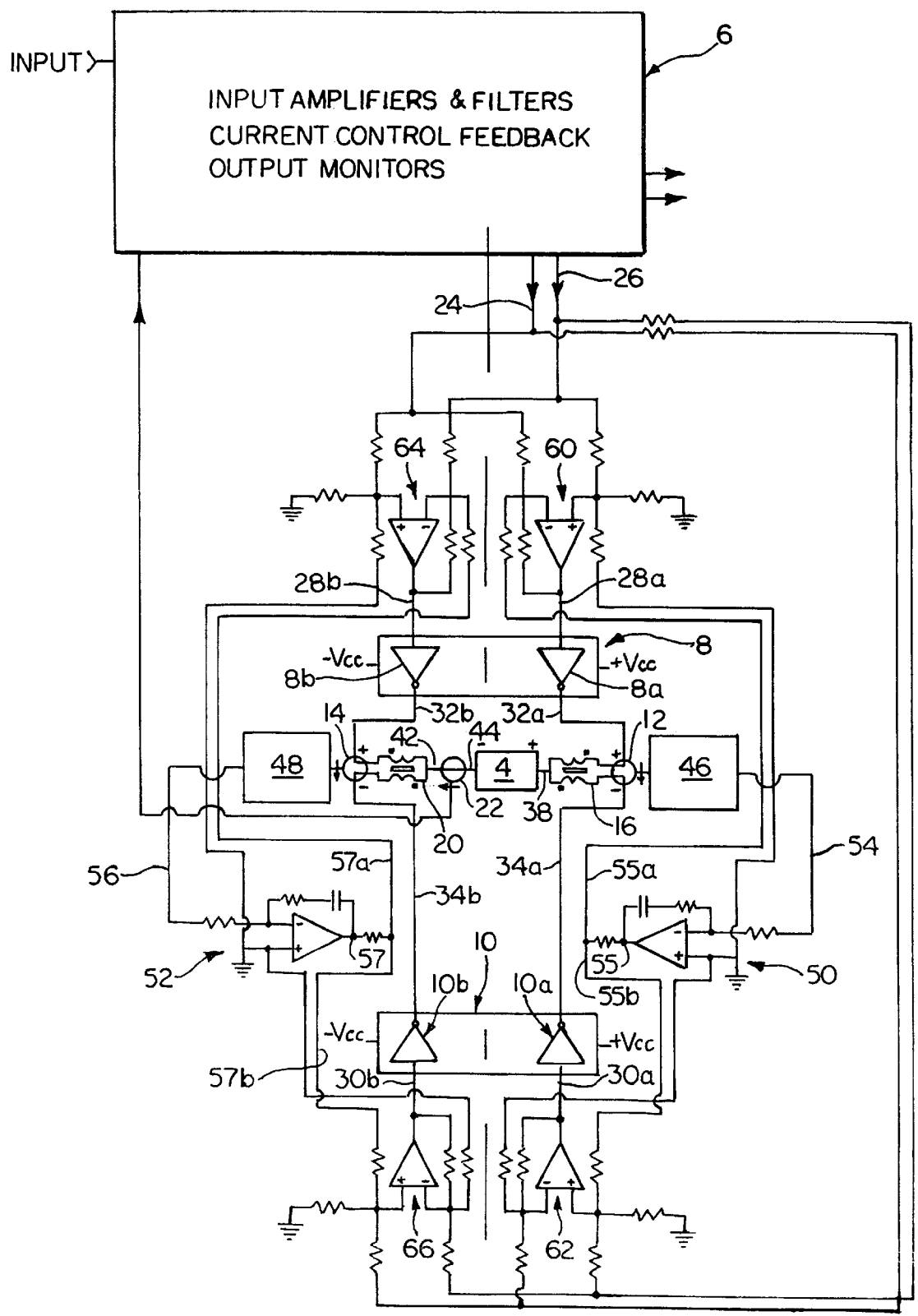
FIG. 1 is a schematic view of an N of 2 paralleled balanced output amplifiers, showing specific circuitry for the novel features and characteristics.

With respect first to FIG. 1, and N of 2 paralleled balanced amplifier circuit is shown generally as reference numeral 2 which is generally used for the purpose of providing balanced output to a load 4, such as a gradient coil 4. With reference still to FIG. 1, the circuit 2 would further include an assembly of state of the art circuitry shown generally at 6, which would encompass input amplifiers and filters, current control feedback and output monitors, and the like. The circuit 2 would also include first and second power modules 8 and 10 which comprise individual amplifiers 8a, 8b and 10a and 10b respectively. The circuit 2 further comprises current sensing transducers 12 and 14 and passive devices 16 and 20. A main current transducer 22 is provided medially positioned between the load and the passive device 20 providing a feedback loop to the state of the art circuitry 6.

With respect still to FIG. 1, an input signal is provided to the power modules 8 and 10 via buses 24 and 26, while the input to individual amplifiers 8a and 8b is via buses 28a and 28b respectively; and to amplifiers 10a and 10b via buses 30a and 30b respectively. Meanwhile, the outputs of amplifiers 8a and 8b are interconnected to current sensing transducers 12 and 14 via buses 32a and 32b respectively, while the outputs of amplifiers 10a and 10b are directed through current sensing transducers 12 and 14 via buses 34a and 34b. The current sensing transducer 12 is interconnected to the passive device 16, while the passive device 16 is interconnected to the load 4 by way of a bus 38. Likewise the current sensing transducer 14 is joined to the passive device 20, which in turn is interconnected to the main current transducer 22 by way of bus 42, and then directly to the load by way of bus 44.

With reference still to FIG. 1, pre-amps 46 and 48 are interconnected to the transducers 12, 14 and then to further amp circuits 50 and 52, by way of buses 54 and 56. The output at 55 of amp 50 is then diverted to summing amp circuits 60, 62 via buses 55a, 55b, respectively. Meanwhile, the output at 57 from amp 52 is diverted to summing amp circuits 64, 66 via buses 57a, 57b. The loop is closed when the output is again joined to the main power amps 8a, 10a by buses 28a, 30a; and when the output of the amps 64, 66 is again joined to the power amps 8b, 10b by buses 28b, 30b.

With reference now to FIG. 1, the operation of the invention will be described relative to its diagrammatic sketch, and in relation to the preferred embodiment of the invention. It should be understood that, one of the preferred modes of operation for the invention is for use in the amplification within magnetic resonance imaging (MRI) devices, but the invention is not so limited to such a use. It should also be understood that while this specific application, that is for use with an MRI, requires a full bridge configuration, that the invention is its broadest sense is not so limited, but rather could be used in some applications in a half bridge configuration, for example, for use in driving a poly-phase motor, etc. FIG. 1 shows by way of the dashed line, the symmetry line for the half bridge configuration. It should also be appreciated that there are two balancing signals involved because there are two half bridge pairs coming together, that is, two half bridge pairs that are going to be combined, that is amplifiers 8a and 10a.

When these two signals are not balanced, there will not be perfect gain coming to the load and a circulating current will be formed which flows around the loop through the passive device 16. For this reason, sensor 12 is precisely placed within the circuit, is actually sensing the difference current in buses 32a and 34a. It is therefore represented with a positive mark and a negative mark because of the passing through in opposite directions; so that twice the different is actually sensed by its core. The core then reports that as a dc coupled signal which is then amplified by the error amplifier 46, 50 which integrates, and which error signal is sent back to become part of the input signal to the amplifier. It should be appreciated that the identical course of action is true on the opposite half-bridge, that is through transducer 14, sensing the difference current through buses 32b and 34b.

Figure 2:
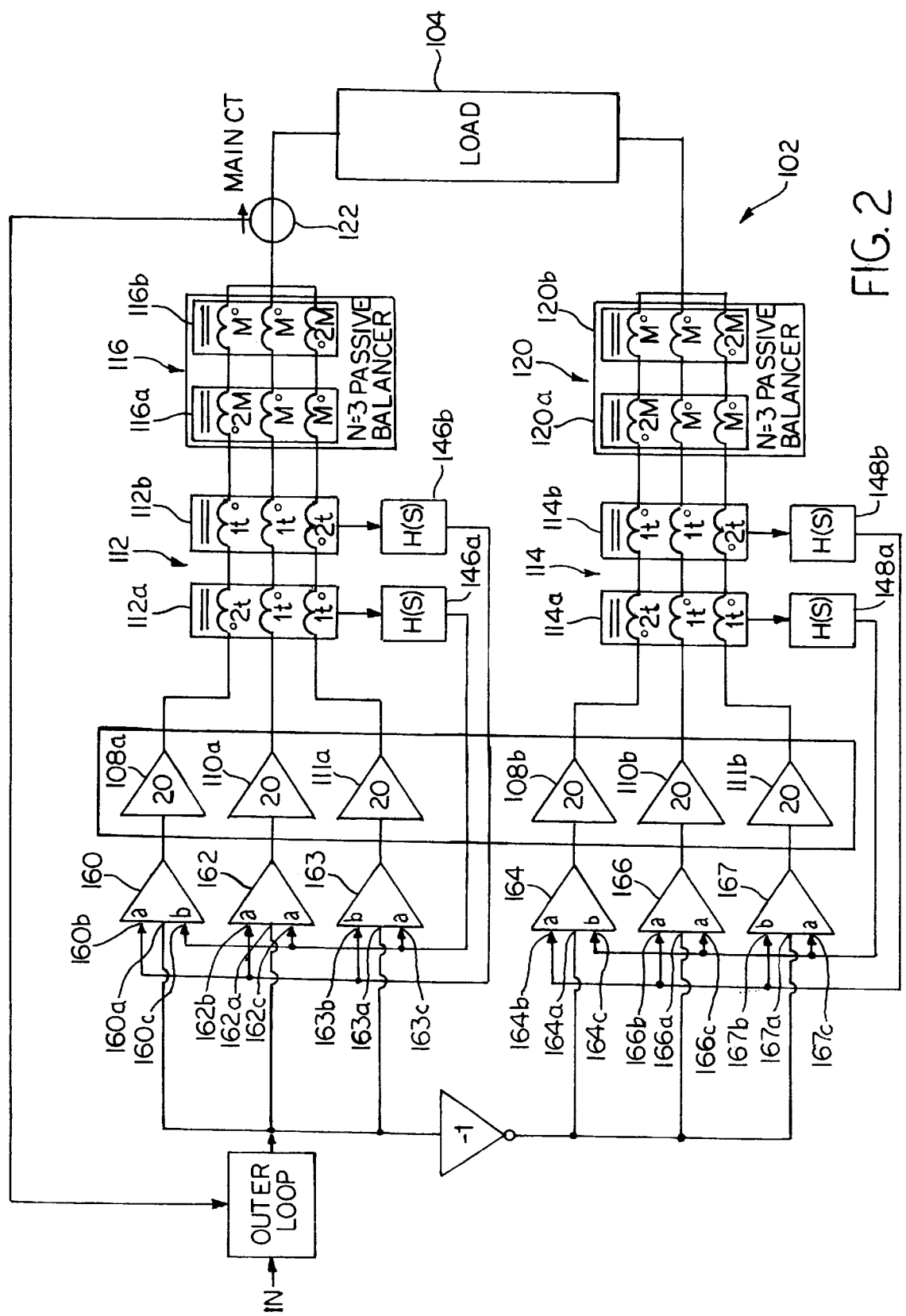
FIG. 2 is a schematic view of a further embodiment of the invention, including an N of 3 paralleling method.

It should be appreciated from FIG. 1, that two current sharing methods are introduced, where the first has been described in relation to the current sensing balance transducers 12, 14; and which are for use at low frequencies. At high frequencies, the coupled magnetic device 16, 20 are used to provide a module to module inductance, without adding to the output inductance of the pair. With reference now to FIG. 2, the sizing of the current sensors such as 12, 14; and the passive devices 16, 20 will now be described in greater detail.

Each one of these amplifiers 160, 162, 163, 164, 166 and 167 is shown now with three input ports, where each has a main input port, each shown as the center port, 160a, 162a, and so on. On these ports, that is these main ports, the coefficients of gain are approximately equal, and the value of the coefficient is immaterial. Each amplifier, 160–167, has two remaining ports, a b-port and a c-port, which receive balancing signals, and are symmetric as it relates to their gain coefficients. The gain coefficients of the two remaining ports are characterized by two gain coefficients, a and b, with the gain coefficients being distributed according to the following table:

| Gain Coefficients | Coefficient a | Coefficient b |
|---|---|---|
| Amplifier Ports | 160b, 162b, 162c, 163c, 164b, 166b, 166c and 167c | 160c, 163b, 164c, and 167b |

The relationship between Gain Coefficients a and b, is the following:

a=−b/2 when b=k, and where k is an arbitrary constant.

The relationship between a and b is important for the balancing, that is upon the error correcting signals coming back into the summing amplifiers 160–167. With reference still to FIG. 2, the current sensing transducers 112a and 112b, 114a, and 114b, and their internal wiring will now be described in detail. It should first be noted that the current transformers 112a, 112b, 114a, 114b form a low pass structure, whereas the passive members 116, 120 form a high pas structure.

Now with respect to the low pass structure, the number of current sensing transducers required is related to the number of amplifiers (N) in the system being paralleled, such that the number of sensors required equals (N−1). With respect now to the wiring, where "t" is the number of turns in the sensor, the sensors 112a and 114a will have 2 t windings in the primary, and 1 t windings in the remaining windings, with the latter windings poled the same way. With respect to sensors 112b and 114b, the windings are opposite to those of sensors 112a and 114a, as shown in FIG. 2. The resulting signals represent a pair of difference equations; differencing the outputs of amplifiers 108, 110 and 111.

Now with respect to the passive system, the system is comprised of inductors 116 and 120, which could be a small toroidal core which are shared by all the windings. In the case of the passive system, the geometry is not important, but just as in the active system, that is sensors 112 and 114, the numbers of windings and polings is. As shown in FIG. 2, the number of windings is shown for each passive device as either M or 2M, where M is the number of turns taken on some common shared magnetic circuit. As mentioned above, the geometry is not the issue, but how the windings are poled and what the relative number of flux lines that are generated that is important. As the currents are matched flowing through these the three separate sections of the passive device, there will be no field in the core because the current will be in balance.

In summary, the low frequency loop comprised of the current sensors 112, 114 monitors imbalance to make sure low frequencies, don't persist on the cores. But the low pass loop has limited bandwidth, and is not capable of tracking rapid errors allowing for rapid errors or short term errors that exist between the voltages found at the outputs of these amplifiers. The passive device can as it is a high pass structure. Further advantageously, there is not net inductance created, nor is there any excess volume of core material having any net flux stored in the core. This also keeps its core small and it keeps its cost low.

As mentioned above, the same winding rules apply to (N−1) magnetic cores as are applied to the current sensing transducers which produce the desired result. In this situation, the turns multiplier for all the current carrying windings may be an integer greater than 1. Each of the cores will have one winding driven with reverse poling that has (n−1) times the turns as do any of the others. Each core's windings are seriesed with those of the next core's until each of the (n−1) amplifiers has one and only one core that represents it with a counter-poled winding. A master amplifier will have no such core and will have passed through identical minimal windings in all (N−1) cores. Care should be used to keep the net resistance similar in all of the wiring including the so-called passive master. Note that the amplifier which is declared to be the master in the passive system is not required to be the pseudo-master in the active balance system.

Advantageously, the passive balance impedance can more practically be created with simply inductors where (N) is large. The impact on the net inductance output source impedance is diluted by (N) regardless. For a small (N) such as 2 or 3, the added output inductance is more of a concern. In this case, lower mu core materials will be used to simple inductor design to minimize the saturation effects. The case of larger (N) also dilutes the need for this type of active balancing system as the noise of (N)'s simple active ballast feedback system is reduced by the square root of (N). Noise is thereby seen to be less improved by large (N) than is the output impedance for the simple inductor case.

What is claimed is:

1. A system of two or more (N) parallel joined power converters having outputs connected in parallel, comprising current sensors to directly measure the circulating currents and by use of negative feedback, regulate the circulating current to zero at a main output, wherein said negative feedback is produced by the circulating current being distributed between the parallel powered converters in such a manner as to sum to zero the combined correction signal injected into the main output signal, wherein said current sensors are DC responding current transducers based on magnetic flux sensing, wherein each of said power converters being paralleled is incident to the primary of the current transducers, wherein each current transducer primary has a number of primary turns, a total of the primary turns on each current transducer being zero when reversed polarity windings are counted as negative turns, wherein each power converter has an identical number of primary turns (M) on the current sensor except for one which has a counter poled winding of M*(N−1) turns.

2. A system of two or more (N) parallel joined power converters having outputs connected in parallel, comprising current sensors to directly measure the circulating currents and by use of negative feedback, regulate the circulating current to zero at a main output, wherein said negative feedback is passed through summing amplifiers which distribute the feedback to said parallel joined power converters, wherein said summing amplifiers (N) input ports.

3. A system of 3 or more (N) paralleled power converters having outputs connected in parallel, comprising passive magnetic devices to facilitate current sharing, said devices being designed to store no magnetic energy when under balanced excitation.

4. The system of claim 3, wherein said passive magnetic devices are inductors.

5. The system of claim 4, including (N−1) inductors.

6. The system of claim 5, wherein each of the power converters has an identical number of primary turns (M) on an (N−1) inductor associated with the power converter except for one which has a counter poled winding of M*(N−1) turns.

7. A system of two or more (N) parallel joined power converters having outputs connected in parallel, comprising current sensors to directly measure the circulating currents and regulate the circulating current to zero, and further comprising passive magnetic devices to facilitate current sharing, said devices being designed to store no magnetic energy when under balanced excitation.

8. The system of claim 7, wherein the circulating currents are differenced, and negative feedback is provided to balance the power converters.

9. The system of claim 8, wherein said negative feedback is produced by the circulating currents being distributed between the parallel power converters in such a manner as to sum to zero in a combined signal output.

10. The system of claim 8 wherein said negative feedback is passed through summing amplifiers which distribute the feedback to said parallel joined power converters.

11. The system of claim 7, including (N−1) current sensors.

12. The system of claim 7, wherein said passive magnetic devices are (N−1) inductors.

* * * * *

UNITED STATES PATENT AND TRADEMARK OFFICE
CERTIFICATE OF CORRECTION

PATENT NO. : 6,297,975 B1
DATED : October 2, 2001
INVENTOR(S) : Gerald R. Stanley Page 1 of 1

It is certified that error appears in the above-identified patent and that said Letters Patent is hereby corrected as shown below:

<u>Claim 1,</u>
Line 14, delete "powered" and insert -- power --

Signed and Sealed this

Ninth Day of April, 2002

Attest:

*Attesting Officer*

JAMES E. ROGAN
*Director of the United States Patent and Trademark Office*